No. 622,176. Patented Mar. 28, 1899.
G. BEACOCK.
BICYCLE WHEEL RIM.
(Application filed Jan. 30, 1899.)

(No Model.)

Witnesses:
John Grist
H. H. Horsey

Inventor:
George Beacock
By Henry Grist
Attorney

THE NORRIS PETERS CO., PHOTO-LITHO., WASHINGTON, D. C.

UNITED STATES PATENT OFFICE.

GEORGE BEACOCK, OF BROCKVILLE, CANADA, ASSIGNOR OF ONE-HALF TO CHARLES H. McCRADY, OF SAME PLACE.

BICYCLE-WHEEL RIM.

SPECIFICATION forming part of Letters Patent No. 622,176, dated March 28, 1899.

Application filed January 30, 1899. Serial No. 703,800. (No model.)

*To all whom it may concern:*

Figure 1:
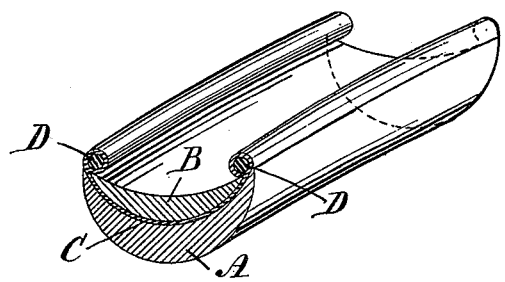
Figure 2:
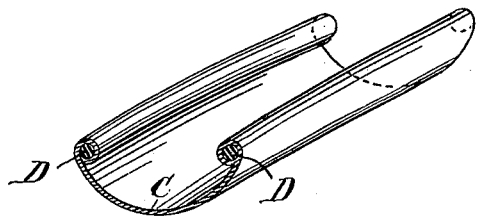
Figure 3:
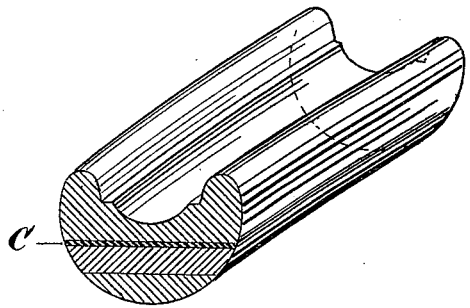

Be it known that I, GEORGE BEACOCK, of Brockville, in the Province of Ontario, in the Dominion of Canada, have invented certain new and useful Improvements in Bicycle-Wheel Rims; and I do hereby declare that the following is a full, clear, and exact description of the same, reference being had to the accompanying drawings, in which—
Figure 1 is a perspective view of a section or portion of my improved wheel-rim, showing the laminations C-shaped or crescent-shaped in cross-section. Fig. 2 is a perspective view of a portion or section of my prepared rawhide hoop or lamination prior to insertion in the wheel-rim; and Fig. 3 is a section of a wheel-rim, showing the prepared rawhide lamination flat in the rim.

My invention has for its object to stiffen and reinforce laminated wheel-rims and to prevent saturation and breakage of the outer edges which retain the tire.

My invention consists in securing between two laminations of a wooden wheel-rim a strip of prepared, hardened, and waterproofed rawhide with or without a wire inserted in the folded edges of said strip, as hereinafter set forth.

The laminated wheel-rim is made up of two or more hoop-sections A B, of wood, concentrically flat or crescent-shaped in cross-section, and an intervening hoop-section or strip C, of prepared, hardened, and waterproofed rawhide, all cemented together.
The rawhide is prepared without destroying or removing the gelatine in the hide and hardened by applying thereto a solution of sulfid of sodium and afterward a solution of borax to toughen it. The hide is split to the thinness desired, dried in a stretched state, then saturated with benzin or naphtha, and finally waterproofed by applying a waterproofing liquid. The prepared rawhide is cut into strips of suitable width and shaped in a machine to suit the curvature in cross-section, and while being so formed the edges of the strip are turned inwardly or folded upon itself and a wire D placed in the fold, whereby the wire will be covered by the rawhide. The strip should be wide enough to allow the wired edges to stand upon but not project outside the rim, so that the wired edges will offer resistance to the pressure of the tire when on the rim and assist the wood rim to withstand rough usage and frictional wear.

I claim as my invention—

1. A laminated wheel-rim, consisting of two or more hoop-sections of wood and an interposed strip or strips of rawhide, prepared, hardened and waterproofed as set forth, all cemented together.

2. A laminated wheel-rim, composed of hoop-sections of wood, crescent-shaped in cross-section, and an interposed strip of rawhide, hardened and waterproofed as set forth, said strip having folded edges and a wire D, inserted therein, as set forth, and all cemented together.

In witness whereof I have hereunto set my hand in presence of two witnesses.

GEORGE BEACOCK.

Witnesses:
H. E. McEWAN,
G. BOGUE SMART.